US011144976B1

(12) United States Patent
Ziegler et al.

(10) Patent No.: US 11,144,976 B1
(45) Date of Patent: Oct. 12, 2021

(54) COLOR SAMPLING SYSTEM FOR ON-DEMAND CUSTOMIZED PACKAGING

(71) Applicant: Brandimation, LLC, Austin, TX (US)

(72) Inventors: Robert A. Ziegler, Austin, TX (US);
Joel Carpenter, Doylestown, PA (US);
Thomas J. Pigott, Islip, NY (US)

(*) Notice: Subject to any disclaimer, the term of this patent is extended or adjusted under 35 U.S.C. 154(b) by 696 days.

(21) Appl. No.: 14/520,340

(22) Filed: Oct. 21, 2014

Related U.S. Application Data

(60) Provisional application No. 61/893,793, filed on Oct. 21, 2013.

(51) Int. Cl.
*G06Q 30/00* (2012.01)
*G06Q 30/06* (2012.01)
*G06Q 20/18* (2012.01)

(52) U.S. Cl.
CPC ......... *G06Q 30/0621* (2013.01); *G06Q 20/18* (2013.01); *G06Q 30/0641* (2013.01)

(58) Field of Classification Search
CPC . G06Q 20/18; G06Q 30/0621; G06Q 30/0641
See application file for complete search history.

(56) References Cited

U.S. PATENT DOCUMENTS

| | | | | |
|---|---|---|---|---|
| 5,949,688 A * | 9/1999 | Montoya | ................ | G06Q 30/06 700/235 |
| 7,111,317 B1 * | 9/2006 | McIntyre | ................ | G06F 8/60 348/207.1 |
| 7,646,392 B2 * | 1/2010 | Klassen | ................ | G06T 11/001 345/549 |
| 7,866,476 B2 * | 1/2011 | McGonagle | ............ | A61J 1/035 206/472 |
| 8,631,322 B2 * | 1/2014 | Isomura | ................ | G09B 29/10 715/253 |
| 9,218,550 B2 * | 12/2015 | Bhatti | ................ | H04N 1/603 |
| 9,396,493 B2 * | 7/2016 | Bhardwaj | .......... | G06Q 30/0631 |
| 2005/0149411 A1 * | 7/2005 | Colwell | ................ | G06Q 30/02 705/26.1 |
| 2009/0041345 A1 * | 2/2009 | Tirumalareddy | ... | G06F 16/5838 382/165 |
| 2009/0225191 A1 * | 9/2009 | Tachikawa | ......... | H04N 1/00132 348/231.2 |
| 2009/0259567 A1 * | 10/2009 | Watts | ................ | G06Q 30/0601 705/26.1 |

(Continued)

FOREIGN PATENT DOCUMENTS

JP 2004228888 A * 8/2004

OTHER PUBLICATIONS

Definition of "capture". Merriam Webster. https://www.merriam-webster.com/dictionary/capture. Accessed Feb. 1, 2019.*

(Continued)

*Primary Examiner* — Anne M Georgalas
(74) *Attorney, Agent, or Firm* — Andrew L. Salvatore, Esquire

(57) ABSTRACT

Apparatus such as a vending machine can store custom-decorated physical products to be dispensed or made available to users and consumers based on a color sampling of another object or person. The invention also includes the method of creating the packaging of the products based on the color sampling of the object or person.

10 Claims, 4 Drawing Sheets

(56) References Cited

U.S. PATENT DOCUMENTS

| | | | |
|---|---|---|---|
| 2009/0281925 A1* | 11/2009 | Winter | G06Q 30/0601 |
| | | | 705/26.1 |
| 2011/0026835 A1* | 2/2011 | Ptucha | G06F 16/583 |
| | | | 382/209 |
| 2012/0057850 A1* | 3/2012 | Klappert | H04N 21/23424 |
| | | | 386/278 |
| 2013/0189650 A1* | 7/2013 | Lee | G09B 11/00 |
| | | | 434/81 |
| 2013/0300761 A1* | 11/2013 | Ahmed | G01J 3/463 |
| | | | 345/595 |
| 2014/0037884 A1* | 2/2014 | Wambolt | G06F 17/50 |
| | | | 428/43 |
| 2014/0052584 A1* | 2/2014 | Gershon | G06Q 30/0627 |
| | | | 705/26.63 |

OTHER PUBLICATIONS

"Virtual mirror kiosks make beauty shopping 'EZ'", by Antoinette Alexander, Drug Store News 31.2: 66(1), Feb. 9, 2009 (Year: 2009).*

* cited by examiner

COLOR SAMPLING SYSTEM FOR ON-DEMAND CUSTOMIZED PACKAGING

CROSS REFERENCE TO RELATED APPLICATIONS

This application is a non-provisional application of, and claims priority to, provisional application U.S. Application 61/893,793 filed on Oct. 21, 2013. The above referenced prior application is hereby incorporated herein by reference.

BACKGROUND OF THE INVENTION

Custom-printed articles and package labels have long been a known art, and digital printing technologies have enabled more immediate ("on-demand") custom printed articles. For example, in U.S. Pat. No. 4,381,705, Roes et. al describe a modularized ticket preparation system which accepts digital signals to print specific information on each ticket. In U.S. Pat. No. 5,133,827 Ratermann describes a merchandising apparatus which prints and applies custom labels to packaged edible products which are passed under a print nozzle on a conveyor. In U.S. Pat. No. 6,695,501 Nedblake et. al describe an on-demand custom label printing and application system. In U.S. Pat. No. 6,135,654 Jennel describes a method and apparatus for printing digital graphic images directly onto bottles which are conveyed from a gravity-fed hopper.

Such printing systems may be coupled with automatic artwork generation systems such as that described by Terry and Gerstman in U.S. Pat. No. 6,125,374. In their method, each of the predesigned components to be printed onto a package is assembled from a combination of graphic templates and data. This data may be comprised of a variety of visually-related inputs, such as color, shape, size and patterns.

Digital image recording devices such as cameras and scanners are capable of sensing and recording discriminate colors of a scene by use of a variety of sensor technologies, including photocells, charge-coupled device (CCD) image sensors, complementary metal-oxide-semiconductor (CMOS) imaging chips and the like. Once colormetric, luminance, and/or photometric sensing is performed, these devices typically store an array of color values into a digital computer file, which may be stored in computer random access memory known as RAM or in storage devices such as magnetic platters, solid-state devices or the like. This storage may be within the recording or sensing device itself, or it may be immediately transmitted from the recording device to another computing device through multiple commonly known means such as hardware connections like universal serial bus connections, wireless network connections leveraging radio waves of different bandwidth with communication protocols such as Bluetooth and the like. Each point in the array may for example have values recorded which correspond to the luminance of red, green, and blue light (RGB), within a set scale. For example, the scale for each color might be from 0-255, with 0 having no luminance and 255 having maximum luminance. Similarly, printing devices apply specific amounts of ink to a substrate in an array of small dots; together, these dots are perceived by the human eye as a single color at a distance away from the dots where the dots can no longer be perceived as individual marks. The perception of such color is affected by color of the substrate onto which the ink is deposited. Recording values for each point in a color array is only relative to what has been called a "colorspace." Colorspaces are mathematical models of recording colorimetric and other color-related data of both the individual color values and other factors which may influence human perception of those colors. The interpretive algorithmic conversion from the additive RGB colorspace of a digital image recording to a perceptually equivalent subtractive colorspace of ink printing such as used in offset printing (cyan, magenta, yellow, and black inks, or CMYK) has in the last three decades become commonplace, and is considered both an art and a science. Multiple computer programs contain such conversion algorithms or a value conversion table called a color look-up table (CLUT) for RGB, CMYK, and other colorspaces. For example, the free and open-sourced software suite known as ImageMagick can convert an image from one colorspace to another.

The automatic extraction of color palettes (a finite selection of multiple colors, typically more than 1 and less than 10; these also known as color themes or color schemes) from the arrays of color values found within digital image files is a more recent art and science, which is also facilitated by interpreting a digital image through a mathematical model. Multiple such models exist to create a color palette from predominant and/or dominant colors within a digital image, including general clustering techniques and color histogram peaks. There are a number of published works which describe these and other models, including Morse's "Image-Based Color Schemes" in *IEEE International Conference on Image Processing* v3 (2007); and Lin and Hanrahan's "Modeling How People Extract Color Themes from Images" (2013). There are also a number of existing standalone and network-based computer programs which employ such models to extract color palettes from digital images, including Adobe Systems' Kuler (http://kuler.adobe.com), Colour Lovers' Copaso (http://www.colourlovers.com/copaso/ColorPaletteSoftware), and MailChimp's Pictaculous (http://www.pictaculous.com/).

Customization and personalization of three-dimensional products can make them more appealing to consumers. For example, it has long been a practice to personalize products such as pens through decoration: by imprinting or engraving a person's name on the pen. From iced cakes to t-shirts to mugs to cereal cartons, all sorts of products and packaging have more recently been decorated with photographs of a consumer's choosing, due in large part to the ubiquity and accessibility of digital imaging devices. In US 2004/1065218, Fredlund describes a method for using a digital image for customization and personalization purposes. In the known art of using digital images for three-dimensional product customization and personalization purposes, the photographs are used for their representational content, not as a source of a color palette.

In U.S. Pat. No. 8,326,029, Obrador describes a method for extracting the background color palette from a set of images, and then applying that color to a lookup table for a color-based image search. In the patent, Obrador describes how to isolate foreground objects from background objects in order to extract a palette from the background alone. There are multiple such techniques for isolating and recognizing various components within photographs. For example, in U.S. Pat. No. 8,068,676, Zhang et. al describe a method of isolating foreground components within a digital image: specifically, they can recognize and isolate clothing articles and components.

In a whitepaper entitled "Automatic color scheme picker for document templates based on image analysis and dual problem" written for HP Laboratories (2006), Obrador also describes a process of extracting a palette of colors from a digital image to apply to graphic templates within a document in order to ensure the graphic template colors are complementary to the digital photograph. The object of this is to automatically generate and apply colors to a graphic element like a logo or field of color which match those in the background of a photograph so that when they are displayed or printed together there is a harmonious appearance. This is similar to how a picture framing store might choose a specifically colored mat based on the content of a photograph or artwork, in order to border that photograph or artwork with a matching color. In a similar fashion, a paint store might use a spectrophotometer to custom mix paints to match an object presented by a consumer.

The art and science of matching colors is not only an object of graphic design, it is also an object of fashion design. A person mixes and matches clothing articles to create an "outfit" and selects fashion accessories for that outfit so that each complements the other to create a harmonious appearance. Zhang et. al claim one object of their invention is to assist a person in finding matching articles of clothing or based on a similar image recognition and query function as described in Obrador's patent. In US 2013/0117137, Klein et. al describe a similar image recognition and query function based on a person's appearance in order to recommend makeup products for purchase.

None of the prior art uses generation of color palettes based on digital samples of a subject's clothing articles to automatically color a fashion accessory intended for sale which matches or complements that subject's clothing. None of the prior art uses generation of color palettes based on digital samples of a subject's clothing articles to automatically color a three-dimensional object such as a package which is intended to match or complement the subject's clothing articles in the same way a fashion accessory might match or complement the subject's clothing articles and existing accessories.

It is an object of the current invention to use digital color sampling of a subject for the purpose of coloring the content of a physical product to match or complement the colors of that subject which was sampled. In a preferred embodiment of the invention, the subject is the clothing and accessories of a consumer, and the physical product is a packaged edible product. In another preferred embodiment of the invention, the physical product is a branded beverage product.

SUMMARY OF THE INVENTION

Apparatus such as a vending machine can store custom-decorated physical products to be dispensed or made available to users and consumers based on a color sampling of another object or person. The invention also includes the method of creating the packaging of the products based on the color sampling of the object or person. In this exemplary embodiment of the method, the device contains means for acquiring a digital image of the user or consumer, sampling the color palette of the consumer's clothing, appearance, etc, by use of image processing software, extracting a color palate from the image. This color palate is used to replace or augment a predesigned graphic template stored in the machine in the form of a textual and visual data. The consumer may be provided with means of selecting from a range of such stored graphic templates, or the device may produce preset templates. The template, modified with the color palette based on the image of the consumer, is then printed to a substrate.

The substrate may be a wrapper, label, package, or the actual surface of the object to be made available to the consumer. Objects may include items such as beverage containers, cups, boxes, food items enclosed in film or other wrappers, and the like. Various printing means may be provided depending on the nature of the product to be dispensed and the type of substrate or material enclosing it.

High-speed, high-resolution printing systems that are now available can provide the ability to modify these objects and substrates and apply decoration to products quickly, giving users the ability to modify and personalize products quickly at point of purchase. Additionally, the software in the device may be designed to allow stored templates to be reprogrammed and updated, giving the ability to tailor the decorative content to the particular purchase channel, store, location, season, region, user age group, current marketing programs of the product's producer, etc.

In an embodiment of such a method, a product storage system similar to a typical beverage vending machine is equipped with a digital imaging device, image processing software and hardware, data storage means, user interface devices, graphics printing means, transaction processing means, and a system of conveying the modified physical product to the user.

DETAILED DESCRIPTION OF THE INVENTION

The present disclosure describes various embodiments for colorizing packaging decoration for products so that the packaging may match or complement the articles of clothing and accessories worn by a consumer. Consumer-operated digital imaging systems can be configured to print articles without the presence of a salesperson or an expert graphic artist.

Certain details are set forth in the following description and in FIGS. 1-4 to provide a thorough understanding of various embodiments of the disclosure. Other well-known structures and systems often associated with digital imaging devices and packaged product kiosks have not been shown or described in detail below to avoid unnecessarily obscuring the descriptions of the various embodiments of the disclosure. Additionally, a person of ordinary skill in the relevant art will understand that the disclosure may have additional embodiments that may be practiced without several of the details described below. In other instances, those of ordinary skill in the relevant art will appreciate that the methods and systems described can include additional details without departing from the spirit or scope of the disclosed embodiments.

Many of the details, dimensions, functions and other features shown and described in conjunction with the Figures are merely illustrative of particular embodiments of the disclosure. Accordingly, other embodiments can have other details, dimensions, functions and features without departing from the spirit or scope of the present disclosure. In addition, those of ordinary skill in the art will appreciate that further embodiments of the disclosure can be practiced without several of the details provided below.

Figure 1:
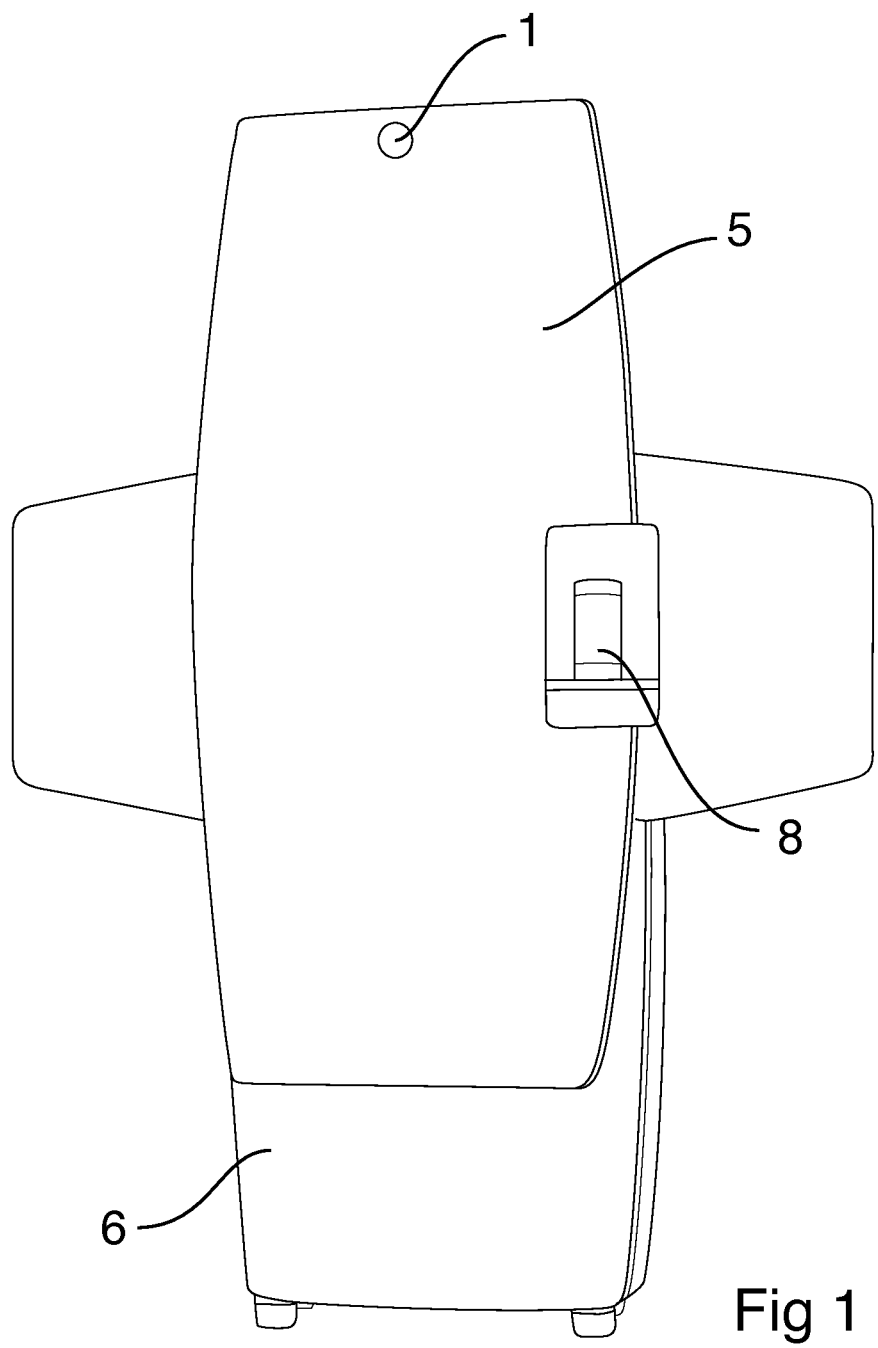
FIG. 1 shows a perspective view of a kiosk as described in the invention.

FIG. 1 is a perspective view of a consumer operated kiosk for colorizing packaging decoration in accordance with an embodiment of the disclosure. The kiosk contains a digital imaging device 1 which digitally samples the colors of a user standing in front of the kiosk. The display and user interface 5 may prompt the user with choices of articles for sale which are stored within a storage area 6 inside the kiosk body. Once a user has chosen an article and made any necessary purchase transactions, the product packaging is decorated and the finished colorized product 8 is dispensed.

Figure 2:
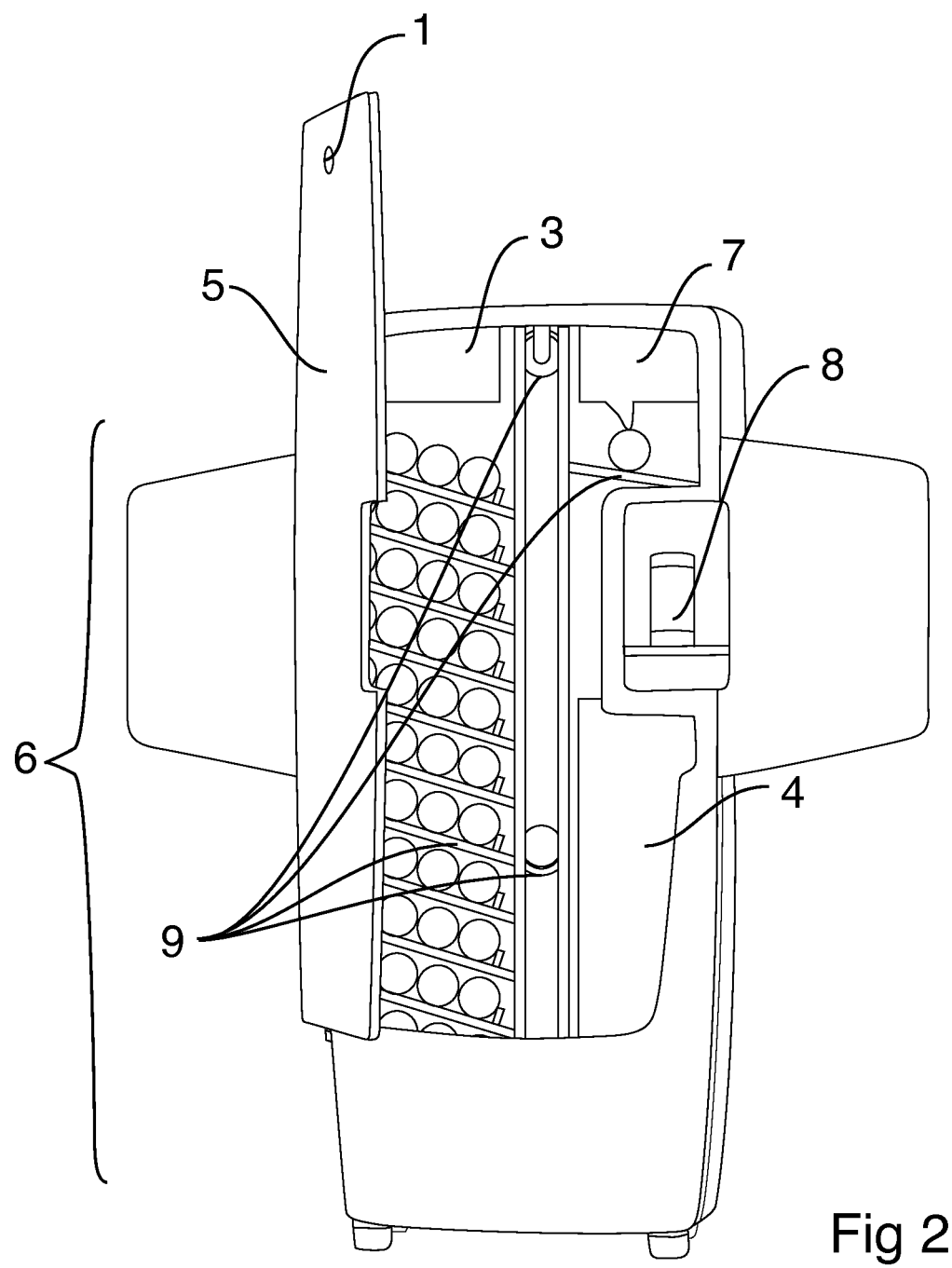
FIG. 2 shows a perspective view of the kiosk when opened to show the components of the device.

FIG. 2 is a perspective view of an opened consumer operated kiosk for colorizing packaging decoration in accordance with an embodiment of the disclosure. The kiosk would be thus opened by a service technician to service the unit or replenish consumables inside the unit including product 8, and ink and printable substrates used by a printer and applicator 7.

Figure 3:
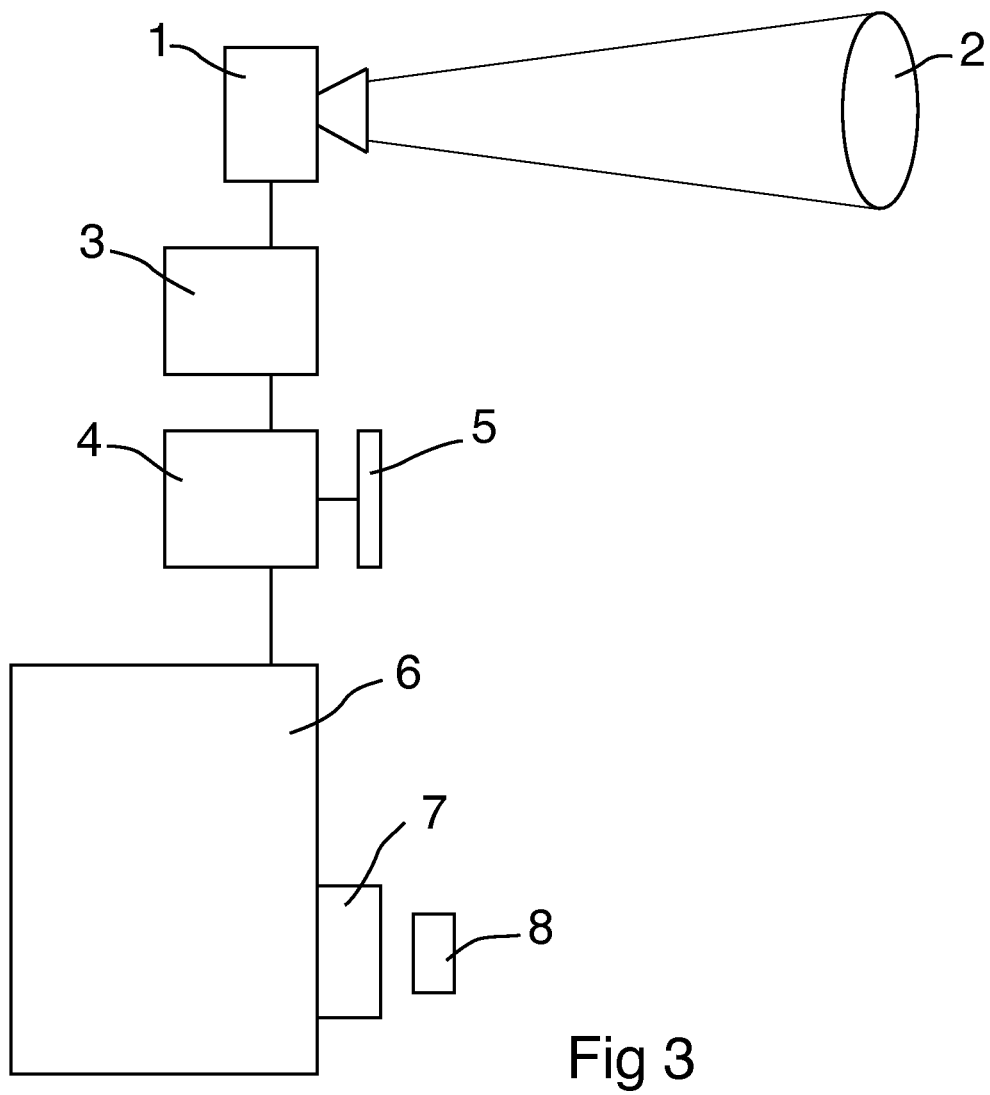
FIG. 3 shows a block diagram of the device.

FIG. 3 is a block diagram of a system for colorizing packaging decoration in accordance with an embodiment of the disclosure, and may be referred to in conjunction with FIGS. 2 and 1 when describing all of the system components which facilitate the disclosed method of colorizing packaging decoration. The digital imaging device 1 digitally samples the colors of a source scene 2 and sends the digitally sampled color data to an image storage and processing device 3, where a computer program stores the color data, digitally isolates the color data associated with a consumer in the scene and in particular the clothing and accessories worn by that consumer. The digital imaging device may be selected from the group consisting of digital color cameras, digital color video cameras, digital color scanners, colorimeters, and spectrophotometers. The digital imaging device may contain an input source which may be comprised of sensors selected from the group consisting of luminosity sensors, photocells, photodetectors, photoresistors, light-dependent resistors (LDRs), photoconductive cells, photoconductors, photodiodes, phototransistors, charge-coupled device (CCD) image sensors, complementary metal-oxide-semiconductor (CMOS) imaging chips, photomultipliers, and contact image sensors (CIS).

A color palette of between 1 and 10 colors is then automatically extracted from the color data which matches or complements the colors of the clothing and accessories worn by the consumer, and this color data is matched to a graphic template stored in the image storage and processing device 3 which comprises the textual and visual data needed to merchandise a corresponding product 8. Textual data may include nutritional information, ingredient information, producer information, product instructions and the like. Visual data may include brand logos, illustrations, background colors and the like. The image storage and processing device applies the color data associated with the extracted color palette to replace or add to the existing color data in said graphic template. Once a consumer has made a product selection by interacting with user interface 5 and completing any necessary financial transaction with transaction processing system 4, a product stored in product storage area 6 is conveyed by conveyance system 9 to the decoration printing and application system 7. At the same time, the graphic template data which has been modified with the color palette color data is sent from the image storage and processing device 3 to the decorating printing and application system 7. The decoration is printed and applied to the product 8, which is then conveyed to the consumer.

The decoration printing and application system may be comprised of a label printer and label applicator. The label applicator may apply mechanical pressure or heat to the label. The label printer may be a printer selected from the group consisting of a liquid inket printer, a thermal printer, a toner-based printer, a solid ink printer, a dye sublimation printer, a liquid ink electrostatic printer, a plotter, and an impact printer.

Figure 4:
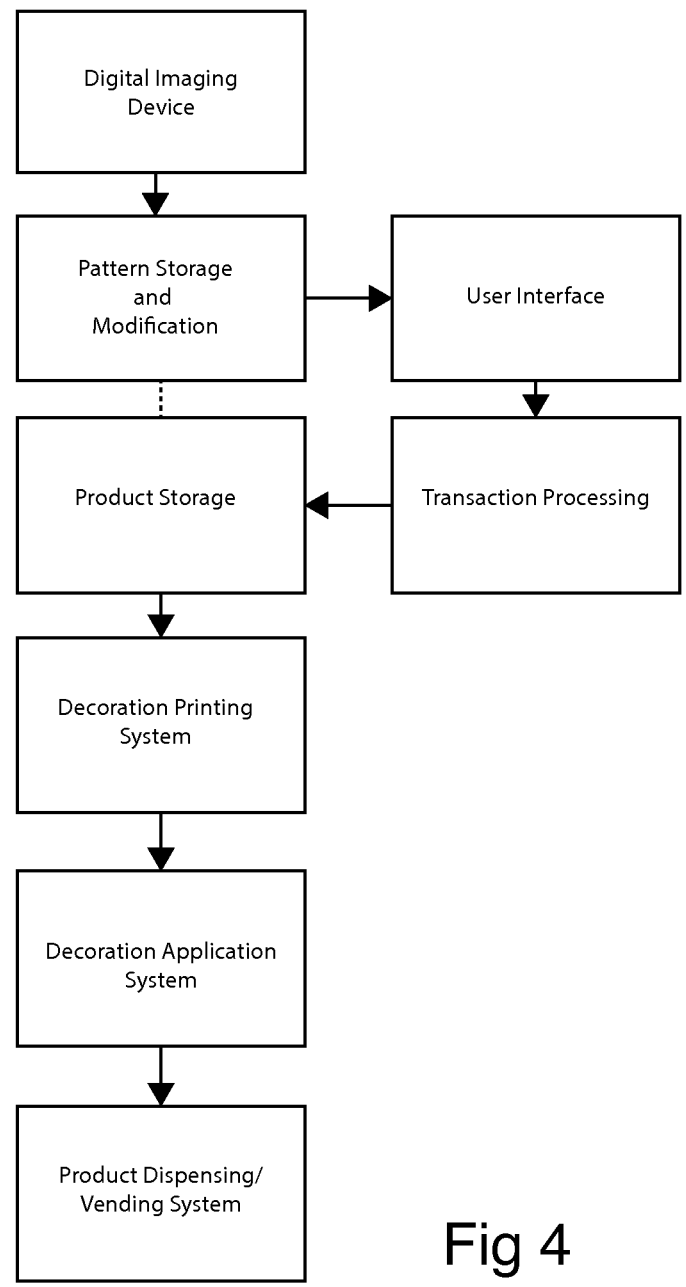
FIG. 4 shows a process diagram depicting one embodiment of the disclosed method.

FIG. 4 is a process flowchart which further describes subsystems used in one embodiment of a method of coloring packaging decoration.

What is claimed:

1. A method of coloring packaging decoration for products, comprising the steps of:
    Providing a consumer operated kiosk including an inventory of products;
    Digitally sampling colors of a consumer's clothing outfit and accessories by capturing a digital image of a consumer with a digital imaging device and sampling the colors of the consumer's clothing outfit and accessories with the digital imaging device within the kiosk to obtain digital sample data;
    Computationally extracting a color palette from the digital sample data with a processing device and applying that color palette to a predesigned graphic template associated with an inventoried product stored within the kiosk;
    Receiving a consumer's selection corresponding to the product in inventory substantially at a time the consumer's clothing outfit and accessories are digitally sampled;
    Printing, with a printer within the kiosk, the graphic template associated with the product selected by the consumer, the graphic template being colored according to the color palette onto a packaging decoration of the consumer selected product in inventory;
    Applying the decoration to packaging of the product selected by the consumer; and
    Dispensing, by the kiosk, the decorated packaged product selected by the consumer.

2. The method of coloring packaging decoration for products as in claim 1 wherein the digital imaging device obtains the digital image of the consumer and samples the colors of the consumer's clothing outfit and accessories from the digital image while the consumer is selecting the product.

3. The method of coloring packaging decoration for products as in claim 1 wherein the product is a beverage.

4. A consumer operated kiosk for purchasing products, the kiosk comprising:
    An inventory of products;
    A product storage area which contains the products;
    A mechanical dispensing structure in connection with the product storage area for dispensing the products;
    A digital imaging device configured to capture a digital image of a consumer and sampling colors from the digital image of the consumer's clothing outfit and accessories, the digital imaging device capturing the digital image at substantially the same time as receiving the consumer's selection corresponding to the products;
    An image storage and processing device which stores predesigned graphic templates associated with the inventory of products, a graphic template being associated with an product, to be used to print decorations for packaging of the products and which extracts a color palette from the digital image and applies the color palette to the predesigned graphic templates in order to print said decoration; and A decoration printing and application system which prints and applies said decoration to said packaging of the products.

5. The kiosk of claim 4 wherein the digital imaging device is selected from the group consisting of digital color cameras, digital color video cameras, digital color scanners, colorimeters, and spectrophotometers.

6. The kiosk of claim 4 wherein the digital imaging device contains an input source comprised of sensors selected from the group consisting of luminosity sensors, photocells, photodetectors, photoresistors, light-dependent resistors (LDRs), photoconductive cells, photoconductors, photodiodes, phototransistors, charge-coupled device (CCD) image sensors, complementary metal-oxide-semiconductor (CMOS) imaging chips, photomultipliers, and contact image sensors (CIS).

7. The kiosk of claim 4 wherein the decoration printing and application system is comprised of a label printer and label applicator.

8. The kiosk of claim 7 wherein the label applicator applies mechanical pressure to a label.

9. The kiosk of claim 7 wherein the label applicator applies heat to a label.

10. The kiosk of claim 7 wherein the label printer is a printer selected from the group consisting of a liquid inkjet printer, a thermal printer, a toner-based printer, a solid ink printer, a dye sublimation printer, a liquid ink electrostatic printer, a plotter, and an impact printer.

* * * * *